(12) United States Patent
Smith et al.

(10) Patent No.: US 8,687,522 B2
(45) Date of Patent: *Apr. 1, 2014

(54) DISTRIBUTED STORAGE OF ROUTING INFORMATION IN A LINK STATE PROTOCOL CONTROLLED NETWORK

(75) Inventors: Peter Ashwood Smith, Hull (CA); Guoli Yin, Nepean (CA); William McCormick, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 182 days.

This patent is subject to a terminal disclaimer.

(21) Appl. No.: 13/420,720

(22) Filed: Mar. 15, 2012

(65) Prior Publication Data

US 2012/0207061 A1  Aug. 16, 2012

Related U.S. Application Data

(63) Continuation of application No. 12/728,977, filed on Mar. 22, 2010, now Pat. No. 8,149,736, which is a continuation of application No. 11/714,508, filed on Mar. 6, 2007, now Pat. No. 7,684,352.

(60) Provisional application No. 60/856,256, filed on Nov. 2, 2006.

(51) Int. Cl.
*H04L 12/28* (2006.01)

(52) U.S. Cl.
USPC .......................................................... 370/255

(58) Field of Classification Search
None
See application file for complete search history.

(56) References Cited

U.S. PATENT DOCUMENTS

2012/0269096 A1* 10/2012 Roskind ...................... 370/255

* cited by examiner

*Primary Examiner* — Chirag Shah
*Assistant Examiner* — Amar Persaud
(74) *Attorney, Agent, or Firm* — Anderson Gorecki & Rouille LLP

(57) ABSTRACT

A distributed hash table is implemented to store routing information on a network. Node IDs exchanged in connection with implementation of a link state routing protocol are used as keys in the distributed hash table, and routes are stored at one or more nodes on the network. When a route is learned, the route is processed against the set of keys to determine which nodes should store the route. When a route is needed, the route is processed against the set of keys to determine which nodes should have the route information. The manner in which the route is processed against the set of keys is the same in both instances, so that the DHT may be used to store and retrieve route information on the network.

30 Claims, 4 Drawing Sheets

Figure 4

DHT membership table 70

| Node ID |
| --- |
| Node ID 131 |
| Node ID 221 |
| Node ID 345 |
| Node ID 351 |
| Node ID 378 |
| Node ID 380 |
| Node ID 384 |
| Node ID 419 |
| Node ID 598 |

Figure 5

Local data table 72

| Key | Data |
| --- | --- |
| Key 279 | Data |
| Key 312 | Data |
| Key 346 | Data |
| Key 377 | Data |
| Key 378 | Data |
| Key 383 | Data |
| Key 384 | Data |

Figure 6

Remote Data Table 74

| Key | Node ID | Data |
| --- | --- | --- |
| Key 221 | Node ID 598 | Data |
| Key 245 | Node ID 384 | Data |
| Key 279 | Node ID 351 | Data |
| Key 312 | Node ID 351 | Data |
| Key 346 | Node ID 346 | Data |
| Key 348 | Node ID 131 | Data |

DISTRIBUTED STORAGE OF ROUTING INFORMATION IN A LINK STATE PROTOCOL CONTROLLED NETWORK

CROSS REFERENCE TO RELATED APPLICATIONS

This application is a continuation of U.S. patent application Ser. No. 12/728,977, filed Mar. 22, 2010 now U.S. Pat. No. 8,149,736, which is a continuation of U.S. patent application Ser. No. 11/714,508, filed Mar. 6, 2007 now U.S. Pat. No. 7,684,352, which claims the benefit of U.S. Provisional Application No. 60/856,256, filed Nov. 2, 2006, entitled "Use of Link State Topology and Distributed Hash Tables to Create Very Large Distributed Databases," the content of each of which is hereby incorporated herein by reference.

TECHNICAL FIELD

The present invention relates to routing information management and, more particularly, to a method and apparatus for the distributed storage of routing information in a link state protocol controlled network.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular Protocol Data Unit (PDU) may be handled by multiple network elements and cross multiple communication links as it travels between its source and its destination over the network.

When a network element receives a request to transmit data to an unknown network address, the network element may attempt to obtain the routing information required to reach the unknown network address. There are several common ways of determining routing information for a PDU. For example, in an Ethernet network a request may be broadcast onto the network by the network element, to see if any of the other network elements know how to reach the particular address. When the broadcasting network element receives a reply it knows how to forward the Ethernet frame to the intended address. This occurs commonly in connection with a provider edge node that is required to map a particular customer address to a provider MAC Address so that the frame may be forwarded across the provider network. In this instance, the provider edge node may have routing information to reach all of the other provider edge nodes, but may not have routing information for all of the customer routes that are available through all of the other provider edge nodes. The provider edge node will need to determine which of the other provider edge nodes is able to reach the customer route before forwarding the PDU on toward that provider edge node.

Where the address requested is an IP address, a common way to find the network location of the resource associated with the IP address is to pass a request to a Domain Name Service (DNS). The DNS system is a hierarchical system that relies on caching more popular addresses on distributed DNS servers throughout the network, so that the lower level servers are able to handle many of the IP resolution requests without requiring the DNS root server or those servers higher up in the hierarchy to become involved. Specifically, a node with an unknown IP address will pass a request to its local DNS server and, if that server doesn't have the requisite information, it will pass the request further up the hierarchy until a server is reached that has a copy of the required information.

As the number of nodes on a provider network increases, and the number of customer routes available through the network increases, resolving route requests by broadcasting the requests to all nodes becomes increasingly inefficient. Specifically, broadcasting requests requires each node on the network to process each request which becomes inefficient as the number of nodes increases and as the number of requests increases.

Similarly, with the advent of IP telephony, the number of one-time requests for an IP addresses is expected to increase. For example, if the IP addresses being requested are associated with destinations of telephone calls being made on the network, it would be expected that a majority of the requests for routing information associated with these IP addresses would be one time requests since it is unlikely for many people to consistently call a same small set of telephone numbers. As the proportion of one time requests for IP addresses increases, the efficiencies of a the hierarchical nature of the DNS service may be expected to decrease, since multiple requests are increasingly unlikely to be made for the same IP address. Specifically, caching relatively recent requests for IP addresses may be expected to be of less value where it is increasingly unlikely that a second request for the same IP address will be received within a particular period of time. This may be expected to increase demand on the DNS root server and potentially cause the DNS service to become a bottleneck on the network.

Accordingly, it would be advantageous to provide a new way of making routing information available on a network.

SUMMARY OF THE INVENTION

A distributed hash table is implemented to store routing information on a network. According to an embodiment of the invention, node IDs exchanged in connection with implementation of a link state routing protocol are used as keys in the distributed hash table, and routes are stored at one or more nodes on the network. When a route is learned, the route is processed against the set of keys to determine which nodes should store the route. When a route is needed, the route is processed against the set of keys to determine which nodes should have the route information. The manner in which the route is processed against the set of keys is the same in both instances, so that the DHT may be used to store and retrieve route information on the network. The DHT may be implemented to store MAC addresses, IP addresses, MPLS labels, or other information of interest to enable routes to be stored and learned by network elements on the network.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 4-6 are data structures that may be used to implement tables stored by a network element such as the network element of FIG. 2 to enable the network elements to participate in the DHT according to an embodiment of the invention;

DETAILED DESCRIPTION

Figure 1:
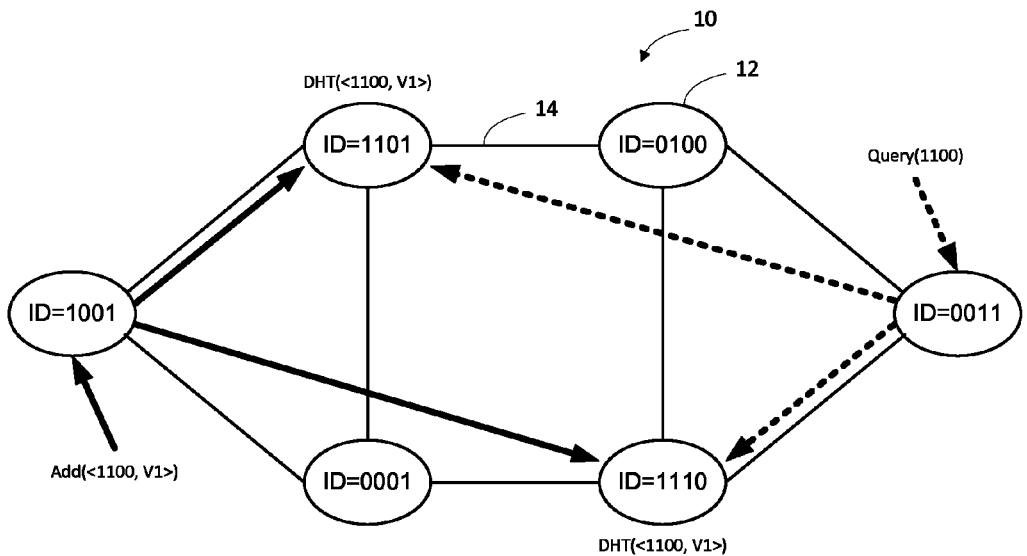
FIG. 1 is a functional block diagram of an example network that may be used to implement an embodiment of the invention in which the nodes are implementing a DHT, and showing route add and route query operations.

FIG. 1 shows an example communication network 10 in which network elements 12 are interconnected via links 14. The network elements may define an autonomous network and implement a link state routing protocol such as Intermediate System to Intermediate System (IS-IS) or Open Shortest Path First (OSPF), to enable routes between the network elements 12 to be calculated. The network elements on the network 10 will exchange hello messages to learn adjacencies between nodes and exchange link state advertisements to enable all nodes on the network to build a link state database representing the topography of the network.

Although particular emphasis will be provided in connection with describing an embodiment in which the network is an Ethernet network implementing a link state protocol to control routing on the Ethernet network, the invention is not limited in this manner as the network 10 may also be implemented as an IP network, MPLS network, or another network.

Using a link state protocol to control an Ethernet network enables the Ethernet network to be scaled from the LAN space to the WAN or provider network space by providing more efficient use of network capacity with loop-free shortest path forwarding. Rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network.

One example of a link state protocol controlled Ethernet network of this nature was disclosed in application Ser. No. 11/537,775, filed Oct. 2, 2006, entitled "Provider Link State Bridging," the content of which is hereby incorporated herein by reference. As described in greater detail in that application, the nodes in a link state protocol controlled Ethernet network exchange hello messages to learn adjacencies of other nodes on the network, and transmit link state advertisements to enable each node on the network to build a link state database. The link state database may be used to compute shortest paths through the network. Each node then populates a Forwarding Information Base (FIB) which will be used by the node to make forwarding decisions so that Ethernet frames will be forwarded over the computed shortest path to the destination. Since the shortest path to a particular destination will depend on the source of the traffic, the network traffic may be distributed across a larger number of links than where one or more Spanning Trees are used to carry traffic on the network.

Within a given administrative domain, the network elements forming an Ethernet network may forward packets based on the destination MAC addresses of the network elements on the network that are part of a given administrative domain. When traffic arrives at an edge of the network, the edge network element will map the traffic to a service and forward the traffic across a path through the network associated with the service.

One common instance where this may occur is where customer traffic is to be routed over a provider's Ethernet network. A customer frame addressed using the customer MAC addressing space will traverse the customer network until it reaches the edge of the customer network. When the frame reaches the provider network, the provider network will look at the destination address (C-MAC address) and determine which node on the provider network is able to reach that customer MAC address. As described in greater detail below, a distributed hash table may be used to store the provider-customer associations so that the provider network element is able to learn this association by issuing a query to the DHT.

As another example, in an IP network, the location of a resource associated with an IP address may need to be found by a router on the IP network. According to an embodiment of the invention, the IP address and network location may be stored in a DHT in which the nodes on the network implement portions of the DHT. As yet another example, in an MPLS network a label edge router may need to learn which label to use to forward traffic across a label switched path through the network. The labels may be stored in a DHT implemented by the network elements to enable the label for a flow of traffic to be retrieved.

As described in greater detail below, a distributed hash table may be formed such that each node on the network has a node ID that forms a key in the distributed hash table. Each node is then configured to store a subset of the total amount of routing data with a hash value sufficiently close to it's key. When a node learns a route, it stores a local copy of the route and forwards a copy of the route to those nodes in the network that are configured to store that portion of the DHT (i.e. nodes whose IDs are 'close' to the route's key/ID). The node ID and route ID may be hashed or otherwise processed in a consistent fashion so that the node IDs and route IDs occupy the same space.

Implementing a link state routing protocol also enables all nodes to know the identity of all other nodes on the network. Specifically, as part of the link state routing protocol, the nodes will all transmit link state advertisements containing their node ID and information related to the links to which they are connected. This information will be used to form a link state database. As described in greater detail herein, according to an embodiment of the invention, the node IDs that are exchanged in connection with the link state routing protocol may be compared to route keys stored in the distributed hash table so that each node knows, from its link state database, which nodes are responsible for storing which route keys in the DHT. The keys may then be used to store and retrieve route information from the DHT in a deterministic manner. By using the node information in the link state database to determine the keys of the DHT which should be stored by that node, it is possible to simplify calculation of the keys to make the DHT more easily implemented. Additionally, changes to the LSDB may be propagated into the DHT so that the DHT membership may be automatically adjusted as network topography changes.

Distributed Hash Tables are a peer-to-peer technology that is described in greater detail in a paper by E. RESCORLA, entitled *Introduction to Distributed Hash Tables*, and in a paper by P. MAYMOUNKOV, et al., entitled *Kademlia: A Peer-to-Peer Information System Based on the XOR Metric*, the content of each of which is hereby incorporated by reference. According to an embodiment of the invention, routing information such as user-to-provider address associations and IP routing information may be stored in very large networks by distributing the data of such associations evenly across the network by causing the data to be stored in a distributed hash table, with the network elements each assuming responsibility for storing a portion of the distributed hash table. The node IDs determined from the LSDB may be compared to route/keys in the DHT to enable the nodes to determine where known routing information should be stored, and where unknown routing information may be found.

When the node receives route information, it will store the route information and make that information available upon request. By causing each node to store a portion of the routing information, no node is required to store the entire routing table so that storage requirements on any one node may be reduced. By specifying a redundancy factor, multiple copies of the information may be stored in the DHT so that failure of any one node will not affect the ability of other nodes to find particular route information.

Figure 2:
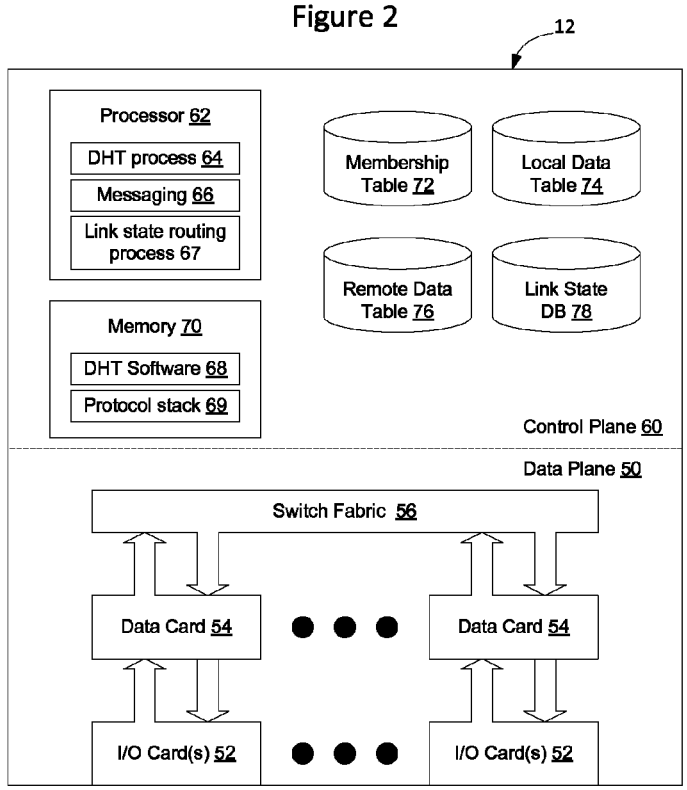
FIG. 2 is a functional block diagram of network element that may be used to implement a node and participate in the DHT according to an embodiment of the invention.

FIG. 2 illustrates an example of a network element that may be used to implement an embodiment of the invention. As shown in FIG. 2, the network element includes a data plane 50 and a control plane 60. The data plane 50 generally includes Input/Output cards configured to interface with links on the network, data cards 54 configured to perform functions on data received over the I/O cards 52, and a switch fabric 56 configured to switch data between the data cards/I/O cards. The control plane contains a processor 62 containing control logic configured to implement a DHT process 64, a messaging process 66, and a link state routing process 67. The messaging process may be used, for example, to format the DHT add message and DHT query messages, to add DHT entries containing routing information into the DHT and to extract DHT entries from the DHT. Other processes may be implemented in the control logic as well. Data and instructions associated with the DHT and messaging process may be stored as DHT software 68 in memory 70. Data and instructions associated with the link state routing process 67 may be stored as protocol stack software 69 in memory 70. Local data tables 72, remote data tables 74, membership tables 76, and link state database 78, examples of which are described in greater detail herein, may be maintained in the memory 70, in other memory within network element 16, or interfaced to the network element and stored in external memory.

Figure 3:
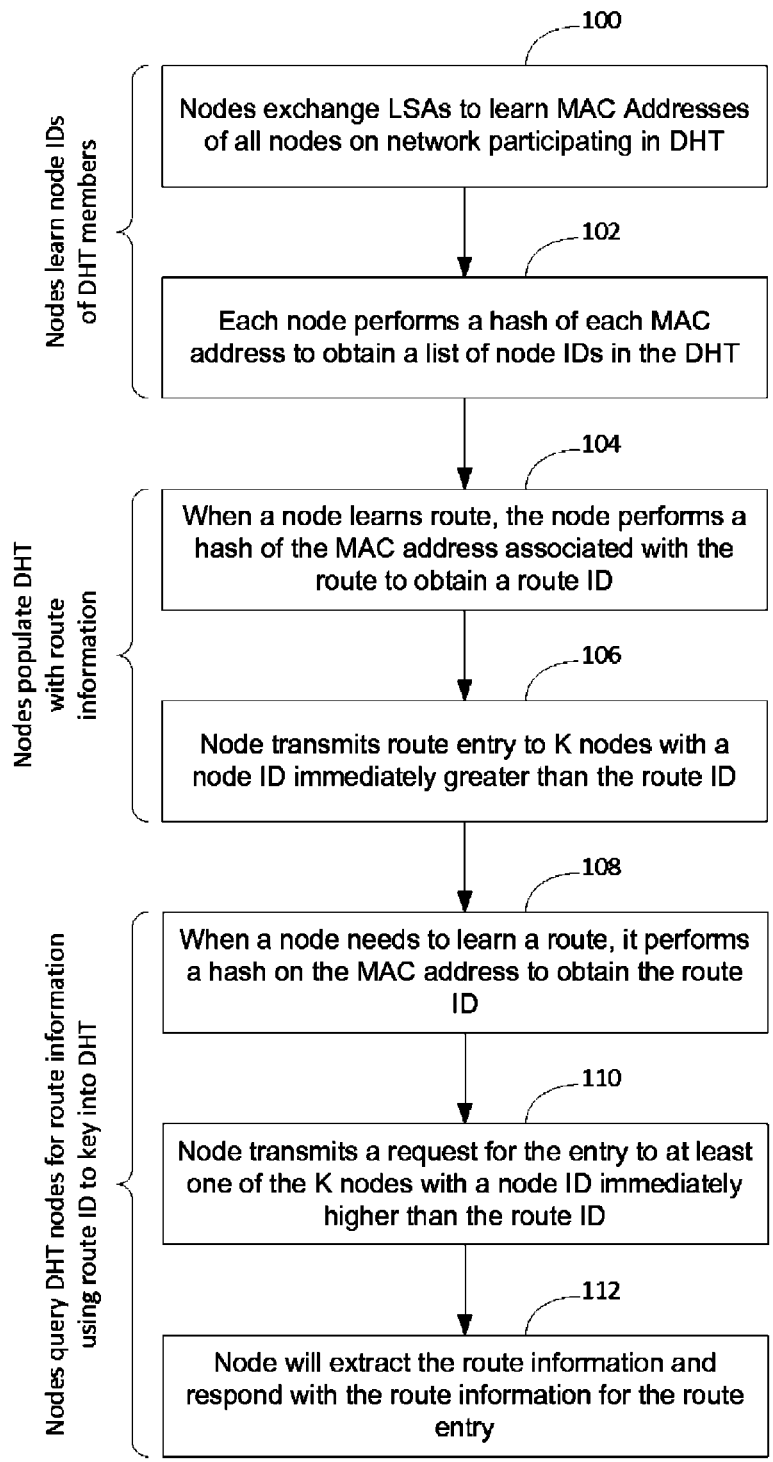
FIG. 3 is a flow chart illustrating a process that may be used to establish and use a DHT to store route information according to an embodiment of the invention.

FIG. 3 illustrates a process that may be used to implement an embodiment of the invention. FIG. 3 provides an overview of the process; additional details are set forth below in connection with FIGS. 4-9 which show the data structures of example tables that may be used to implement portions of the Distributed Hash Table (DHT) according to an embodiment of the invention.

As shown in FIG. 3, the nodes exchange link state advertisements (100) to learn the MAC addresses of all nodes on the network participating in the DHT. Each node will use the node IDs to build a DHT membership table (see FIG. 4) which will enable the nodes to determine which of the nodes should be used to store particular keys/routes, and to enable the nodes to determine where queries for particular keys/routes should be sent. For example, each node on the network will have a MAC address. The MAC address may be hashed to create a node ID, which may then be ordered to create a membership table (102). Alternatively, the node MAC address itself may be the node ID. Although an embodiment of the invention will be described in which the node MAC address is used to create the node IDs, the invention is not limited in this manner as other information may be used as the basis for the DHT. For example, the node's IP addresses may be used to form the basis of the node's DHT ID.

Nodes on the network are connected to customer LANs and learn customer-provider associations (C-MAC to P-MAC pairs), which also will be referred to as routes. Routes are associated with a customer MAC address (the key to the pair) which may be use to determine where the route should be stored in the distributed hash table.

Accordingly, as shown in FIG. 3, when a node learns a route, the node performs a hash on the C-MAC address associated with the route to obtain a route/key ID (104). The hash function is the same as the hash function that was used to create the node IDs, so that the route ID and node IDs have the same format and, accordingly, may be easily compared using an XOR process or other mathematical process. The node will then compare the route ID with the node IDs found in (102) to determine which of the nodes is sufficiently "close" to the route ID. An example of how the comparison is performed is described in greater detail in connection with FIG. 1. As shown in FIG. 1, assume a node 1001 learns a <key, value> pair (<C-MAC/P-MAC> in our example) it wants to store in the distributed hash table so that all nodes are able to have access to the <key, value> pair. For example, assume that node 1001 learns route <1100, V1>. Node 1001 will perform an XOR on the key (1100) with all other node IDs to determine which nodes have node IDs that are closest to the key ID. The node will then send the <key, value> pair to those nodes that are closest according to the comparison algorithm being used (XOR in this example) so that they may store the <key, value> pair. In the illustrated example, nodes 1101 and 1110 will have the smallest XOR distance with 1100, so the <1100, V1> pair will be sent to only those nodes for storage. Since the route is sent to two nodes for storage, the replication factor in this example is 2 (K=2). The nodes that receive the route will store the <key, value> pair in their remote data table.

As shown in FIG. 3, once the values are stored, when a node needs to learn a route, it will perform a hash on the C-MAC address that it is trying to find to obtain the route/key ID (108). The node will then determine which of the nodes in the DHT should be used to query routing information for the route/key ID by comparing the route ID with the node IDs of the nodes in the membership table. For example, this may be done using the XOR-distance process described above. The nodes will then transmit a request for the <key, value> pair to at least one of the K nodes with a node ID immediately higher than the route ID (110) or to the k nodes that otherwise have a node ID deemed to be closest to the route/key ID. A node that receives the request will extract the route information from its remote data table (see FIG. 6) and respond with the route information (in this case the P-MAC for the requested C-MAC) for the route entry (112).

In the example shown in FIG. 1, assume for example that node 0011 sees a key that it needs a value for. Specifically, assume node 0011 sees key 1100, but doesn't have the value associated with that key. The key may be a hashed C-MAC address associated with a frame received from a customer LAN or may represent another real quantity such as an IP address. The node will perform an XOR between the key and all other node IDs in the topology to find the two closest node IDs to the known key. Note that the node is performing the same XOR-distance process using the same values as was performed when the <key, value> pair was put into the DHT, so it may be expected that the node 0011 will also determine that nodes 1101 and 1110 are likely to have a copy of the value for that key. The node 0011 may transmit a request to the nodes 1101 and 1110 requesting the value for key 1100, and expect that one or both of the nodes will be able to respond with the value V1.

Although an embodiment has been described herein in which the distance between a node ID and route ID was determined by performing an XOR between these values, the invention is not limited in this manner as other mathematical ways of comparing values to determine the relative distance of nodes IDs and route IDs may be used as well.

By causing the value V1 to be stored in the DHT multiple times, the particular number depending on the replication factor K, a requesting node may receive multiple responses. However, storing the values in more than one place in the DHT provides resiliency against failure of any one node in the network, as the information stored in that node may be recreated and redistributed from the other remaining nodes forming the DHT. Adding and deleting nodes from the DHT is described in greater detail below in connection with FIGS. 7-10.

Because the network elements are running a link state protocol such as OSPF or ISIS, each node has a list of nodes and the node addresses. This information may be used to determine node IDs of all provider nodes in the provider network. When the DHT is used to store client/provider associations and a client-to-provider node association is learned, a DHT "add" is done to insert the <client, provider> information into the DHT. Thus, in this instance, the value is the provider node where the client route may be found and the client MAC address is the key which is XORed with the node IDs of the provider nodes to determine which provider node should store the <client, provider> pair.

When a client first wants to talk to another client, it asks the DHT for the provider association with that client by doing a query against the DHT. Specifically, the client value is XORed with the node IDs to determine which nodes in the DHT are supposed to store that <client, provider> address association and then a query will be sent to the provider nodes in the DHT that are determined to store that association. The nodes in the DHT will respond with the <client, provider> pairs so that the client may learn which provider node is able to reach the intended client address. In this manner, the DHT add/query operations use the link state topology to deterministically identify a small number (K) of provider nodes to store/query the <client, provider> associations. By using the node IDs as keys into the DHT, the key calculation process may be greatly simplified. Additionally, since all nodes have an updated copy of the link state database, all nodes have a current copy of the set of node IDs that are being used in the DHT so no additional signaling mechanism is needed to update nodes as the DHT membership/key-ownership changes with changes in network topography.

The keys may be Ethernet MAC addresses, IP addresses such as IPV4 or IPv6 addresses, or Network Application Services Platform (NSAP) addresses or other common or proprietary addresses including MPLS labels or other labels. Similarly, the value to be stored in the DHT with a particular key may also be an Ethernet MAC address, IP addresses such as IPV4 or IPv6 addresses, NSAP addresses, or other common or proprietary addresses, including MPLS labels or other labels. In general wherever a hierarchical routing system is being used and mappings must be stored to map from an upper level address to a lower level address, regardless of the format of either or both addresses, a DHT may be used to store this relationship in an efficient manner. Similarly, the node and route IDs may be taken from the same layer of the Open Systems Interconnection Basic Reference Model (OSI) layer, or may be taken from different layers. For example, the node and route IDs may all be layer 2 values (MAC addresses) may all be layer 3 values (IP addresses) or may be both, i.e. the node IDs may be IP addresses and the route IDs may be MAC addresses, or conversely the node IDs may be MAC addresses and the route IDs may be IP addresses.

FIGS. 4-6 illustrate example DHT tables that may be maintained by one or more of the nodes on the network to implement the DHT described herein. In these figures, FIG. 4 shows an example of a DHT membership table containing a list of node IDs. The Node IDs may be address values of the nodes on the network as learned from the link state database, or may alternatively be formed from hashes of these address values. In the illustrated example, the node ID table contains 9 values which are obtained from the routing system. Specifically, the nodes on the network such as the network shown in FIG. 1 are assumed to be implementing a link state routing protocol in which each node exchanges link state advertisements to enable each node on the network to build a link state database. The link state advertisements and/or the link state database will contain the address of the nodes. The node addresses of those nodes that are participating in the DHT will be used to populate the DHT membership table of FIG. 4. Although a membership table is shown in FIG. 4, this information may be contained as part of the link state database and is thus not required to be stored in a separate table.

FIG. 5 shows an example of a local data table that may be maintained by a node on the network independent of the DHT. Specifically, a node on the network may learn routes from customer equipment that is attached to it. This information may be stored in a local table so that the node is able to maintain a copy of those routes that are reachable through it. The local table may also be used to cache routes learned from the DHT so that repeated attempts to exchange data with a particular remote route may be expedited.

As routes are learned, they are added to the local data table. The routes will also be transmitted to the DHT by comparing (i.e. XORing) the route value with the node IDs to find the K closest matching node IDs. In example shown in FIGS. 4 and 5, the replication factor K (the number of duplicate copies of the information in the DHT) is set to three so that the node that learned the route will transmit the learned route to the three nodes participating in the DHT that are closest to the key value of the route. For example, the route may be sent to the three nodes with node IDs that are higher than the key value of the route. Assume, for example, that the DHT membership table contains IP addresses, and the local node learned a route to an IP address. The IP address of the learned route may be XORed with the IP addresses of the nodes in the DHT membership table to find those three nodes with IP addresses that are most similar ('close') to the learned IP address. The route may then be sent to those three nodes to cause the route information for that IP address to be stored at the correct nodes of the distributed hash table. Of course, the IP addresses may be hashed or otherwise processed before the comparison occurs and other types of addresses may be used as well, since the IP address was used only as an example of a type of address that may be used. This same process may be used to find the IP address in the table as well.

FIG. 6 shows an example of a remote data table that may be stored by a node in the DHT. As shown in FIG. 6, when a node receives an advertised route from one of the other nodes on the network, it will store the route in its remote data table. The table may be organized according to key which is associated with the address of the route, and may contain a value of the node (i.e. the node ID) that is associated with the route. Other data may be associated with the route as well. When another node on the network is required to communicate with the route associated with the route address, the node may compare the route address (route key) with the node IDs (node key) to determine which nodes in the DHT are supposed to maintain the route. The requesting node may then forward a request to the node in the DHT to cause the node to retrieve the route information from its remote data table.

As shown in the example remote data table of FIG. 6, the remote data table contains listings of keys and Node IDs on the network which may be used to reach those keys. For example, key 221 may be reached via node ID 598, Key 245, may be reached via Node ID 384, etc. The set of keys stored in the remote data table 74 is that set of data which is determined to be sufficiently close to the node ID that is maintaining the remote data table, i.e. using the XOR distance calculation process described above. When another node on the network sees a key such as key 245, it may send a request to the node that is maintaining the remote data table 74 to obtain the Node ID where that route is located on the network. Specifically, upon receiving the request the node that is maintaining the remote data table 74 will obtain the value <key 245, Node ID 384> and whatever data is associated with the entry, and respond to the requesting node so that the node that saw key 245 may learn that it is able to reach the route associated with key 245 via node ID 384.

Note in this regard that the keys into the table are based on IP address, Ethernet MAC address, etc., so that each node in the DHT is storing, in their remote data table, routes associated with particular sets of IP addresses, Ethernet MAC addresses, etc. By associating the node IP address or Ethernet MAC address with the set of addresses stored by that node in the DHT in a deterministic manner, other nodes may perform the same computation when faced with an unknown address to determine which node to query to obtain the route for that address.

Figure 7:
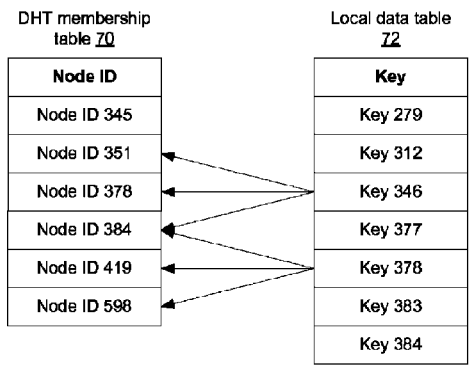
FIGS. 7-8 show the manner in which the DHT changes in connection with adding a node to the DHT according to an embodiment of the invention.
Figure 8:
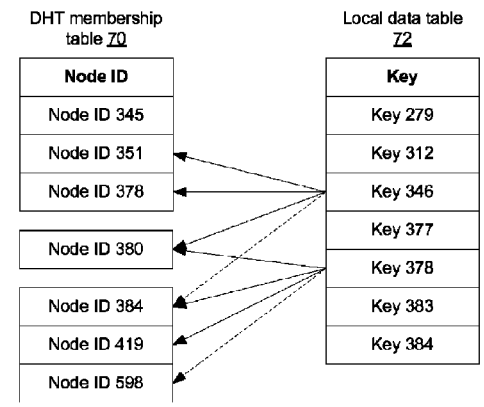

FIGS. 7-8 show the manner in which the DHT changes in connection with adding a node to the DHT according to an embodiment of the invention. As shown in FIG. 7, a DHT membership table will store data that is transmitted to it from other nodes on in the network as those nodes learn routes. When a node learns a route it will be stored in the local data table 72 and then transmitted to other nodes that are identified by the node by looking at the DHT membership table 70. Depending on the replication factor the route information will be sent out one or more times to the nodes that are identified as being required to store the route information in the DHT. In the illustrated example the replication factor is three (K=3) so the node will send the route information to three nodes for storage in the DHT. Thus, in the illustrated example, Key 346 (and its value/route) would be sent to nodes 351, 378, and 384, and key 378 (and its value/route) would be sent to nodes 384, 419, and 598.

Assume now that a new node is added to the DHT with a node ID=380. An example of this is shown in FIG. 8. When a new node is added to the network, the node will start sending out link state advertisements to cause the nodes to add the node to their link state database. The inclusion of the node in the link state database will automatically cause the node ID to be added to the DHT membership table 70. However, the inclusion of the new node in the DHT membership table will affect the manner in which route queries are performed by nodes on the network since the updated DHT membership table will be consulted when determining where to look for a route with a particular key. Thus, the routes that should be stored in that DHT should be transmitted to the new node so that it has a copy of the route information in its remote data table. One way to do this is to have the network elements determine which routes are affected by a change in the membership table and have the nodes transmit routes to the new node if they should originally have been transmitted there. This may be done by causing each node to determine which keys in its local data table should be stored on the node based on the current DHT membership table and cause the nodes to transmit those routes to the new node. Thus, for example, the node in FIG. 8 may determine that new node 380 should have a copy of the route information for key 346 and transmit that route to the new node. The node will also determine that keys 377 and 378 should also be transmitted to node 380 and transmit DHT add messages for those routes as well.

Since the replication factor is still three, and node 384 has already been provided with a copy of the route information, the node 384 will have an extra copy that will not be requested by any other nodes as long as the DHT membership table doesn't change again. Thus, node 384 may be instructed to delete the route associated with key 346 or node 384 may allow the route associated with key 346 to time out and become deleted after it hasn't been requested for a particular period of time.

Figure 9:
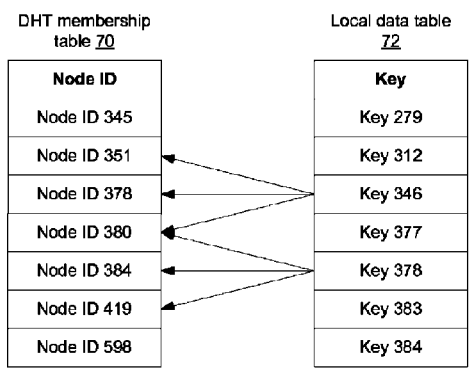
FIGS. 9-10 show the manner in which the DHT changes in connection with deleting a node from the DHT according to an embodiment of the invention.
Figure 10:
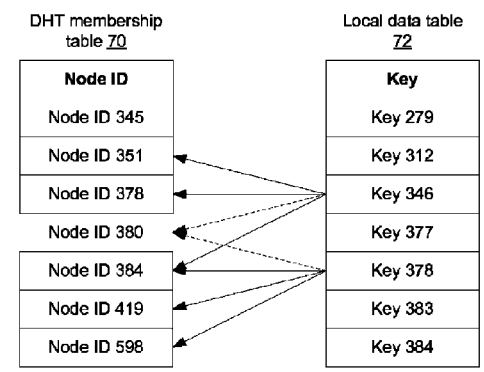

FIGS. 9-10 show the manner in which the DHT changes in connection with deleting a node from the DHT according to an embodiment of the invention. Specifically, FIG. 9 shows the DHT membership table after node 380 was added during the add operation described in connection with FIGS. 7 and 8. It is assumed in FIG. 9 that the replication process has caused extraneous route information to be deleted or timed out as described above in connection with FIG. 8 so that each key is stored at three different nodes in the DHT.

Assume, as shown in FIG. 10, that node 380 is removed from the DHT membership table. Upon removal of node 380, particular routes will only be stored at two locations in the DHT. To cause those routes to be stored in three locations, each local node may review the information in its local data table to determine which keys it had caused to be stored in the DHT at that node. For those keys which are affected, the node may determine which nodes should store the keys based on the new DHT membership, and transmit the keys to those nodes. Alternatively, since some of the remote nodes will already have the key stored in the DHT remote data tables, the node may only transmit the routing information to the last node determined in this process. For example, if the replication factor is K=3, the local node may determine the third node in the DHT that should store a copy of the data and transmit the route information associated with that key only to the third node.

Although an embodiment has been described in which the nodes use the information stored in their local tables to replicate routes to the DHT nodes as the DHT membership changes, the invention is not limited in this manner as other ways of implementing this process may be implemented as well. For example, if a node is added to the DHT, the DHT nodes with node IDs that are within the replication factor of the new node may process the keys in their DHT remote data table to determine which keys should be stored in the new node and transmit those keys to the new node. As part of this process the node may also determine which keys are no longer required to be stored in their remote data table and delete those routes.

Similarly, when a node is removed from the DHT, those nodes that are within the replication factor of the node that has been removed may process the routes in their remote data table to determine which routes were stored in the node that is no longer part of the DHT. Those routes that were stored in the old node may then be transmitted as necessary to the other nodes of the DHT to cause the replication factor for each route to remain the same. Thus, modifications to the DHT membership may be implemented by the DHT nodes without requiring the nodes that learned the route information to readvertise the route information into the DHT whenever the DHT membership changes.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of forwarding packets in a packet network having route information stored in a distributed hash table (DHT) distributed across nodes of the network, the method comprising:
   performing a hash on an address to determine nodes in the DHT to query for a route;
   transmitting a route request to the determined nodes;
   receiving at least one route response from at least one of the determined nodes;
   determining a route from the at least one route response; and
   forwarding packets having the address as a destination address according to the determined route;
   wherein:
   each node is associated with a respective node identifier;
   performing a hash on the address provides a route identifier; and
   nodes in the DHT to query for a route are determined by comparing the route identifier with node identifiers; and
   wherein the node identifiers are stored in a membership table.

2. The method of claim 1, wherein:
   the route identifier is compared to node identifiers to determine a set of nodes having node identifiers deemed closest to the route identifier; and
   the route request is transmitted to the set of nodes having node identifiers deemed closest to the route identifier.

3. The method of claim 2, wherein the route identifier is compared to node identifiers using an XOR-distance process.

4. The method of claim 1, further comprising:
   detecting a network topology change; and
   determining routes affected by the network topology change; and
   for each route affected by the network topology change:
   performing a hash on an address to determine nodes in the DHT to query for a route;
   transmitting a route request to the determined nodes;
   receiving at least one route response from at least one of the determined nodes;
   determining a route update from the at least one route response; and
   storing the route update in a local forwarding table.

5. The method of claim 4, further comprising:
   receiving a packet having a destination address;
   determining a route from the local forwarding table based on the destination address; and
   forwarding the packet according to the route determined from the local forwarding table.

6. The method of claim 1, wherein the address is a media access control (MAC) address.

7. The method of claim 1, wherein the address is a customer MAC (C-MAC) address, and the DHT associates C-MAC addresses with provider MAC (P-MAC) addresses.

8. The method of claim 1, wherein the address is one of an IP address, a Network Application Services Platform (NSAP) address, and an MPLS label.

9. A routing apparatus for routing a packet in a packet network having routing information stored in a distributed hash table (DHT) distributed across nodes of the network, the apparatus comprising:
   at least one processor; and
   at least one non-transitory storage medium storing instructions for execution by the processor, the instructions comprising instructions executable by the processor:
   to perform a hash on an address to determine nodes in the DHT to query for a route;
   to transmit a route request to the determined nodes;
   to receive at least one route response from at least one of the determined nodes;
   to determine a route from the at least one route response; and
   to forward packets having the address as a destination address according to the determined route;
   wherein:
   each node is associated with a respective node identifier;
   performing a hash on the address provides a route identifier; and
   the instructions executable to determine nodes in the DHT to query for a route comprise instructions executable to compare the route identifier with node identifiers; and
   wherein the node identifiers are stored in a membership table.

10. The apparatus of claim 9, wherein:
    the instructions executable to compare the route identifier with node identifiers comprise instructions executable to compare the route identifier to node identifiers to determine a set of nodes having node identifiers deemed closest to the route identifier; and the instructions executable to transmit the route request comprise instructions executable to transmit the route request to the set of nodes having node identifiers deemed closest to the route identifier.

11. The apparatus of claim 10, wherein the instructions executable to compare the route identifier to node identifiers implement an XOR-distance process.

12. The apparatus of claim 9, wherein the instructions further comprise instructions executable:
to detect a network topology change; and
to determine routes affected by the network topology change; and
for each route affected by the network topology change:
to perform a hash on an address to determine nodes in the DHT to query for a route;
to transmit a route request to the determined nodes;
to receive at least one route response from at least one of the determined nodes;
to determine a route update from the at least one route response; and
to store the route update in a local forwarding table.

13. The apparatus of claim 12, wherein the instructions further comprise instructions executable:
to receive a packet having a destination address;
to determine a route from the local forwarding table based on the destination address; and
to forward the packet according to the route determined from the local forwarding table.

14. The apparatus of claim 9, wherein the address is a media access control (MAC) address.

15. The apparatus of claim 9, wherein the address is a customer MAC (C-MAC) address, and the DHT associates C-MAC addresses with provider MAC (P-MAC) addresses.

16. The apparatus of claim 9, wherein the address is one of an IP address, a Network Application Services Platform (NSAP) address, and an MPLS label.

17. A method of forwarding packets in a packet network having route information stored in a distributed hash table (DHT) distributed across nodes of the network, the method comprising:
performing a hash on an address to determine nodes in the DHT to query for a route;
transmitting a route request to the determined nodes;
receiving at least one route response from at least one of the determined nodes;
determining a route from the at least one route response; and
forwarding packets having the address as a destination address according to the determined route;
wherein:
each node is associated with a respective node identifier;
performing a hash on the address provides a route identifier; and
nodes in the DHT to query for a route are determined by comparing the route identifier with node identifiers; and
wherein:
the route identifier is compared to node identifiers to determine a set of nodes having node identifiers deemed closest to the route identifier; and
the route request is transmitted to the set of nodes having node identifiers deemed closest to the route identifier.

18. The method of claim 17, wherein the route identifier is compared to node identifiers using an XOR-distance process.

19. The method of claim 17, further comprising:
detecting a network topology change; and
determining routes affected by the network topology change; and
for each route affected by the network topology change:
performing a hash on an address to determine nodes in the DHT to query for a route;
transmitting a route request to the determined nodes;
receiving at least one route response from at least one of the determined nodes;
determining a route update from the at least one route response; and
storing the route update in a local forwarding table.

20. The method of claim 19, further comprising:
receiving a packet having a destination address;
determining a route from the local forwarding table based on the destination address; and
forwarding the packet according to the route determined from the local forwarding table.

21. The method of claim 17, wherein the address is a media access control (MAC) address.

22. The method of claim 17, wherein the address is a customer MAC (C-MAC) address, and the DHT associates C-MAC addresses with provider MAC (P-MAC) addresses.

23. The method of claim 17, wherein the address is one of an IP address, a Network Application Services Platform (NSAP) address, and an MPLS label.

24. A routing apparatus for routing a packet in a packet network having routing information stored in a distributed hash table (DHT) distributed across nodes of the network, the apparatus comprising:
at least one processor; and
at least one non-transitory storage medium storing instructions for execution by the processor, the instructions comprising instructions executable by the processor:
to perform a hash on an address to determine nodes in the DHT to query for a route;
to transmit a route request to the determined nodes;
to receive at least one route response from at least one of the determined nodes;
to determine a route from the at least one route response; and
to forward packets having the address as a destination address according to the determined route;
wherein:
each node is associated with a respective node identifier;
performing a hash on the address provides a route identifier; and
the instructions executable to determine nodes in the DHT to query for a route comprise instructions executable to compare the route identifier with node identifiers; and
wherein:
the instructions executable to compare the route identifier with node identifiers comprise instructions executable to compare the route identifier to node identifiers to determine a set of nodes having node identifiers deemed closest to the route identifier; and
the instructions executable to transmit the route request comprise instructions executable to transmit the route request to the set of nodes having node identifiers deemed closest to the route identifier.

25. The apparatus of claim 24, wherein the instructions executable to compare the route identifier to node identifiers implement an XOR-distance process.

26. The apparatus of claim 24, wherein the instructions further comprise instructions executable:
to detect a network topology change; and
to determine routes affected by the network topology change; and for each route affected by the network topology change:
to perform a hash on an address to determine nodes in the DHT to query for a route;
to transmit a route request to the determined nodes;
to receive at least one route response from at least one of the determined nodes;
to determine a route update from the at least one route response; and
to store the route update in a local forwarding table.

27. The apparatus of claim 26, wherein the instructions further comprise instructions executable:
to receive a packet having a destination address;
to determine a route from the local forwarding table based on the destination address; and
to forward the packet according to the route determined from the local forwarding table.

28. The apparatus of claim 24, wherein the address is a media access control (MAC) address.

29. The apparatus of claim 24, wherein the address is a customer MAC (C-MAC) address, and the DHT associates C-MAC addresses with provider MAC (P-MAC) addresses.

30. The apparatus of claim 24, wherein the address is one of an IP address, a Network Application Services Platform (NSAP) address, and an MPLS label.

* * * * *